July 16, 1929.  H. H. NESBITT  1,720,920
SHAFT SEAL
Filed July 30, 1926
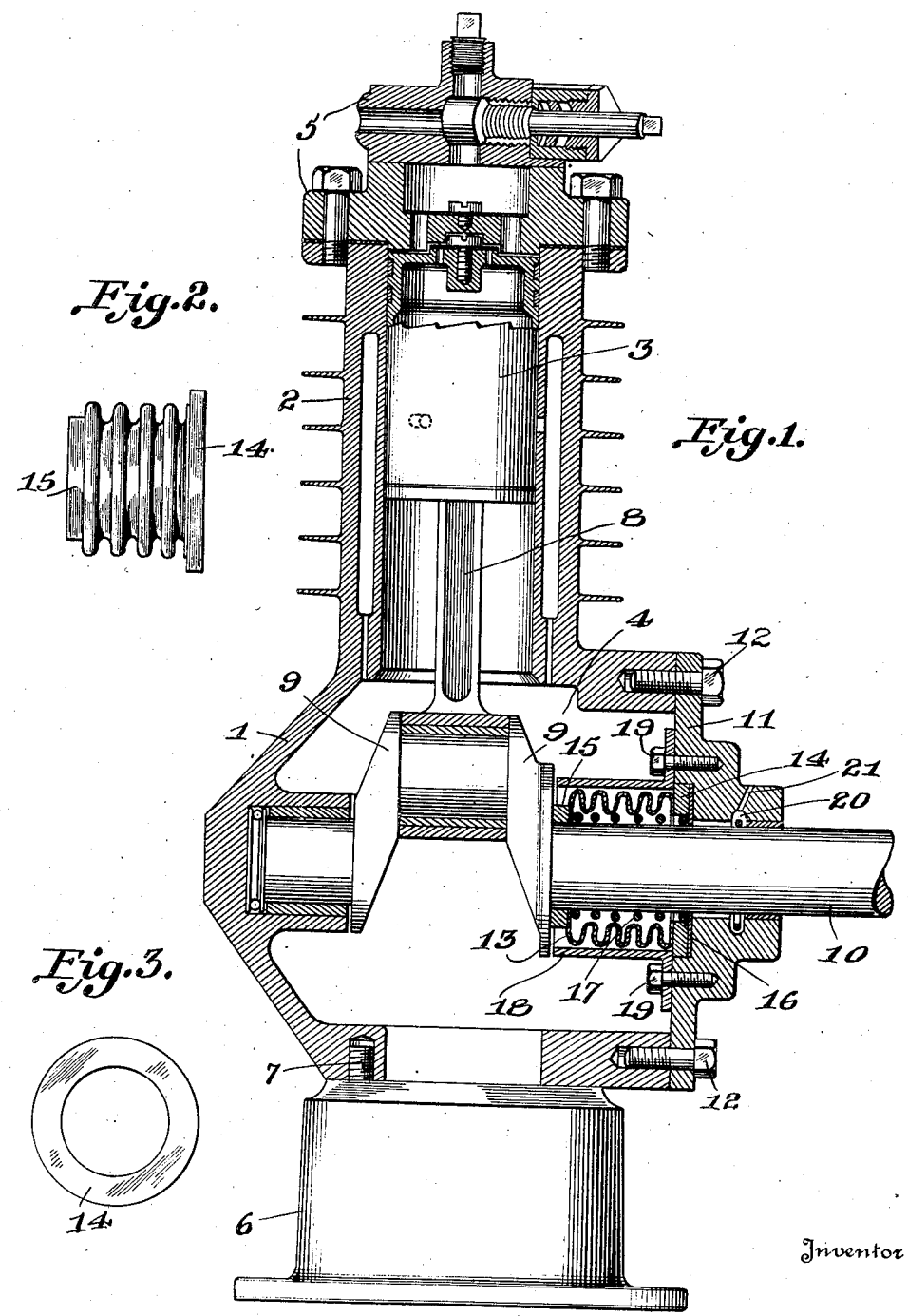

Patented July 16, 1929.

1,720,920

UNITED STATES PATENT OFFICE.

HAROLD H. NESBITT, OF BELAIR, MARYLAND.

SHAFT SEAL.

Application filed July 30, 1926. Serial No. 126,062.

This invention relates to improvements in refrigerating apparatus, particularly in an improved shaft seal adapted for a crank shaft of the compressor which is an ordinary part of a refrigerating apparatus.

An object of the invention is to provide a shaft seal so designed as to receive a suitable lubricant, the shaft seal being arranged on the driving end of the crank shaft and located so as to receive a continuous bath of oil which is in the crank case. The shaft seal as commonly arranged on the crank shaft is located on the outside of the casing cap thereby receiving only a limited and insufficient lubrication.

A further object of this invention is to provide a suitable lubricating means for lubricating the crank shaft.

Another object of this invention is to provide a bellows type shaft seal which may be easily arranged on the driving end of the crank shaft thereby making it possible to more closely assemble the apparatus, particularly in respect to the location of the fly wheel fan on the crank shaft which may, by means of this invention, be brought in close contact with the bearing cap, thereby bringing it into more efficient working with the compressor.

A further object of this invention is to provide a shaft seal which will materially decrease the pressure area of the seal.

Further details of this invention will appear from the following detailed description and from the disclosure of the single sheet of the drawings which is herewith made a part of this application.

In the drawings,

Fig. 1 illustrates a vertical sectional view of the compressor showing the improved shaft seal in proper relationship thereto.

Fig. 2 is a side view of a portion of the shaft sealing means including the bellows and sealing rings connected thereto.

Fig. 3 illustrates an end view of the shaft sealing means disclosed in Fig. 2.

Numeral 1 designates the main housing for compressor or refrigerating apparatus which includes a cylinder portion 2 having slidably positioned therein a piston 3 and a crank case portion 4 adapted to have therein an oil bath in the usual manner. The upper portion of the cylinder is adapted to have attached thereto the usual elements such as a cylinder head portion 5. The opposite end of the housing 1 is suitably connected to a base element 6 by means of machine bolts 7 or otherwise. The piston 3 is connected in the usual manner by means of a connecting rod 8 to a crank 9 and shaft 10. A crank case cap 11 is adapted to be suitably connected to the housing 1 by means of machine bolts 12, and between the inner surface of the cap 11 and the crank element, a shaft seal is properly positioned, the shaft seal to consist of a bellows 13 preferably made of flexible metal or any other suitable material. The bellows is hermetically sealed at the ends thereof to sealing rings 14 and 15. The sealing ring 14 being adapted to be positioned within a depression on the inner surface of the casing cap 11, while the sealing ring 15 is adapted to be suitably placed on the crank shaft in proximity to the crank portion in such a manner as to completely seal the space between the crank shaft and the flexible metal bellows 13 which is located circumferentially of the crank shaft. In order to assure a complete seal, elements 16 are positioned between the sealing ring 14 and the crank casing cap 11. In order to insure constant sealing effect, a tension spring 17 is circumferentially positioned around the crank shaft 10 and within the bellows 13 in such a manner as to give sufficient tension to maintain the sealing ring 15 in constant pressure against the crank portion 9.

A housing 18 for the sealing means is adapted to be attached to the inner surface of the crank case cap 11 by machine screws 19 or otherwise. The housing element 18 will function as a protection to the metal flexible bellows 13, as well as a general guiding element for the crank 9 in its rotation. A shaft seal as ordinarily located in refrigerating compressors is placed on the driving end of the crank shaft outside of the crank casing cap thereby forcing important elements of the compressor to be positioned at an uneconomical distance from the cylinder portion. A shaft seal located in the usual manner is difficult to maintain in a proper lubricated condition. The shaft seal, according to this invention is located on the crank or eccentric end of the crank shaft within the crank casing thereby being located so as to receive a constant bath of oil which is supplied within the casing. In order to provide suitable lubrication for the bearing of the crank shaft 10 where it extends through the cap 11, a suitable oil reservoir and ring 20 may be provided in the cap 11 for the purpose of proper lubrication of the crank shaft at this point, a lubricating opening 21 being provided for admitting oil to the shaft. This invention provides a shaft seal which may be easily applied to the crank shaft in such a manner as to eliminate much of the work of machining and labor necessary for the installation of the common shaft seal.

Various modifications and substitutions may be made within the scope of this application without affecting the merits of the invention.

What I claim is:

In an apparatus of the character described, a crank case containing oil, a crank shaft, a removable cap for the crank case through which the crank shaft is adapted to extend, a seal positioned on the shaft within the crank case adjacent the inner surface of the cap in such a manner as to receive a constant bath of oil from the crank case, means for assuring a complete seal consisting of sealing ring elements countersunk in the inner surface of the removable cap, a housing detachably connected to the inner surface of the cap for protecting the seal, the housing having an open ended portion for admitting oil from the crank case to the seal.

In testimony whereof I affix my signature.

HAROLD H. NESBITT.